United States Patent [19]

Kidokoro et al.

[11] Patent Number: 5,277,029
[45] Date of Patent: Jan. 11, 1994

[54] INTERNAL COMBUSTION ENGINE WITH A DUAL TURBOCHARGER SYSTEM

[75] Inventors: Toru Kidokoro; Mamoru Yoshioka, both of Susono; Toshihisa Sugiyama, Gotenba; Kunihiko Nakata; Yuji Kanto, both of Susono; Keizo Takahashi, Toyota, all of Japan

[73] Assignee: Toyota Jidosha Kabushiki Kaisha, Toyota, Japan

[21] Appl. No.: 900,474

[22] Filed: Jun. 18, 1992

[30] Foreign Application Priority Data

Jun. 18, 1991 [JP] Japan .................. 3-171863
Jan. 8, 1992 [JP] Japan .................. 4-18346

[51] Int. Cl.⁵ ............................. F02B 37/12
[52] U.S. Cl. ............................. 60/612; 60/611
[58] Field of Search ..................... 60/611, 612

[56] References Cited

U.S. PATENT DOCUMENTS

| | | |
|---|---|---|
| 3,038,297 | 6/1962 | Kauffmann . |
| 4,474,008 | 10/1984 | Sakurai et al. .......... 60/611 X |
| 4,781,027 | 11/1988 | Richter et al. .......... 60/612 X |
| 4,793,140 | 12/1988 | Esch .................. 60/612 X |
| 5,137,003 | 8/1992 | Kyoya et al. .......... 60/611 X |
| 5,168,707 | 12/1992 | Yoshioka et al. ......... 60/612 |

FOREIGN PATENT DOCUMENTS

| | | |
|---|---|---|
| 63983 | 11/1984 | Japan . |
| 104718 | 6/1985 | Japan . |
| 61-919 | 3/1986 | Japan . |
| 46628 | 3/1988 | Japan . |
| 58723 | 4/1989 | Japan . |
| 193023 | 8/1989 | Japan . |
| 179130 | 12/1989 | Japan . |
| 241967 | 9/1990 | Japan .............. 60/612 |
| 275939 | 12/1991 | Japan . |

*Primary Examiner*—Michael Koczo
*Attorney, Agent, or Firm*—Cushman, Darby & Cushman

[57] ABSTRACT

An internal combustion engine with a dual turbocharger system includes an air bypass conduit connecting a downstream portion of a first turbocharger compressor with an upstream portion of a second turbocharger compressor so that the length of the air bypass conduit is relatively long. When a throttle is rapidly closed, an air bypass valve installed in the air bypass conduit is opened and the compressed air downstream of the throttle valve is returned to the upstream of the turbocharger compressor to suppress occurrence of a surging at the turbocharger compressor. Since the air bypass conduit is relatively long, the compressed and circulated air is effectively cooled when flowing through the air bypass conduit and melting of an impeller of the turbocharger compressor is prevented.

12 Claims, 11 Drawing Sheets

INTERNAL COMBUSTION ENGINE WITH A DUAL TURBOCHARGER SYSTEM

BACKGROUND OF THE INVENTION

1. Field of the Invention

The present invention relates to an internal combustion engine with a dual turbocharger system which can effectively suppress a surging which may occur when a throttle valve is rapidly closed without causing melting of a compressor impeller.

2. Description of the Prior Art

In a turbocharged engine, when a throttle valve is rapidly closed, the pressure upstream of the throttle valve rises due to the inertia of the intake air and the rotational inertia of the compressor. The pressurized air sometimes generates pressure reflection at the throttle valve and flows upstream toward the compressor to generate a surging and a sound at the compressor.

Japanese Utility Model Publication SHO 63-983 proposes to provide an air bypass conduit bypassing the turbocharger compressor and an air bypass valve installed in the air bypass conduit. The air bypass conduit and the air bypass valve return the pressurized air between the throttle valve and the turbocharger compressor back upstream of the compressor by momentarily opening the air bypass valve during a rapid deceleration to suppress the occurrence of a surging. The air bypass valve includes a diaphragm, a first chamber on one side of the diaphragm connected directly downstream of the throttle valve, and a second chamber on another side of the diaphragm connected downstream of the the throttle valve via a pressure transmittance delay valve. Accordingly, the air bypass valve operates due to the pressure difference generated between the first and second diaphragm chambers.

However, circulation of the intake air through the air bypass conduit and repeated compression of the intake air by the compressor will increase the temperature of the circulated air, which in turn may melt the compressor impeller. In addition, because of the time delay necessary for the intake pressure downstream of the throttle valve to be transmitted to the diaphragm chambers, the air bypass valve responds slowly, further causing the temperature of the compressed air to rise. Furthermore, provision of the air bypass valve alone might be insufficient in some cases for suppressing a surging during a rapid deceleration.

SUMMARY OF THE INVENTION

An object of the invention is to provide an internal combustion engine with a dual turbocharger system which can effectively suppress a surging during a rapid deceleration without melting the compressor impeller.

Another object of the invention is to provide an internal combustion engine with a dual turbocharger system having an air bypass valve capable of quick response.

A third object of the invention is to provide an internal combustion engine with a dual turbocharger system having a controllable air bypass valve and a controllable intake switching valve or an intake bypass valve to more effectively suppress a surging during a rapid deceleration.

BRIEF DESCRIPTION OF THE DRAWINGS

The above described object and other objects, features, and advantages of the present invention will become more apparent and will be more readily appreciated from the following detailed description of the preferred embodiments of the invention taken in conjunction with the accompanying drawings, in which.

DETAILED DESCRIPTION OF THE PREFERRED EMBODIMENTS

Figure 1:
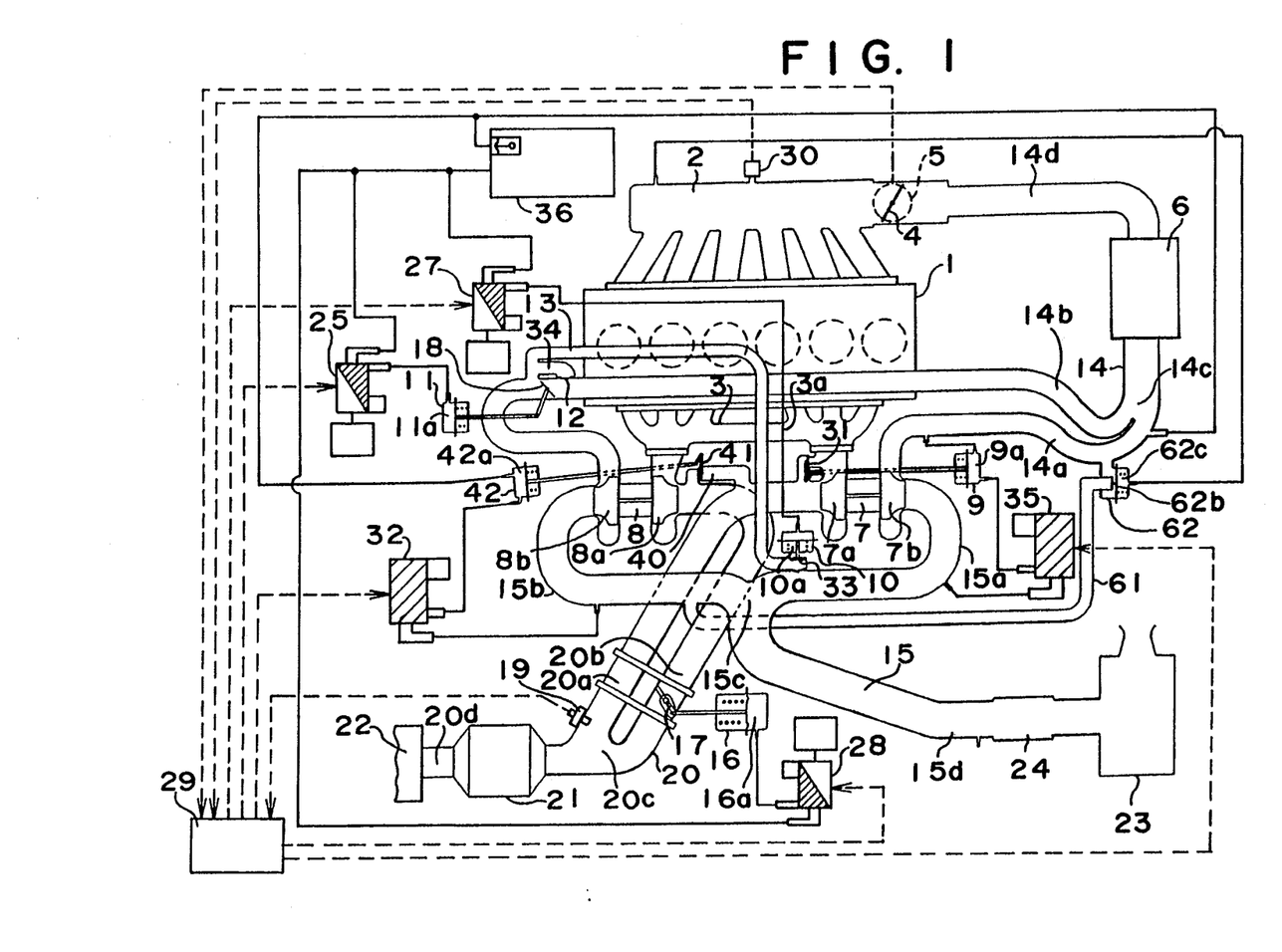
FIG. 1 is a schematic view of an internal combustion engine with a dual turbocharger system in accordance with a first embodiment of the invention.

As illustrated in FIG. 1, an internal combustion engine with a dual turbocharger system in accordance with a first embodiment of the present invention includes a multi-cylinder engine. As an example, FIG. 1 depicts a six-cylinder internal combustion engine 1 with an air intake and an exhaust outlet. The cylinders of the engine 1 are grouped into two groups. An exhaust manifold 3 is connected with the engine exhaust outlets and includes a first portion connected with a first group of engine cylinders and a second portion connected with a second group of engine cylinders. The first and second portions of the exhaust manifold 3 communicate with each other via a connecting conduit 3a.

A first turbocharger 7 and a second turbocharger 8 are positioned in parallel with each other with respect to the engine 1. The first turbocharger 7 is operated throughout all intake air quantities, and the second turbocharger 8 is operated only at large intake air quantities. The first turbocharger 7 includes a turbine 7a and a compressor 7b driven by the turbine 7a. Similarly, the second turbocharger 8 includes a turbine 8a and a compressor 8b driven by the turbine 8a. The turbine 7a is connected with the first portion of the exhaust manifold 3 and the turbine 8a is connected with the second portion of the exhaust manifold 3. As a result, the first and second turbines 7a and 8a are connected with the engine exhaust outlet via the exhaust manifold 3. The compressor 7b and the compressor 8b are connected with the air intake of the engine 1 via a portion of an intake line.

The intake line connected with the engine air intake includes a first intake passage 15 positioned upstream of the compressors 7b and 8b and a second intake passage 14 positioned downstream of the compressors 7b and 8b. The first intake passage 15 includes a first intake pipe 15a located upstream of and connected with the compressor 7b, a second intake pipe 15b located upstream of and connected with the compressor 8b, a connecting portion 15c where the first intake pipe 15a and the second intake pipe 15b join each other, and a common intake pipe 15d located upstream and connected with the connecting portion 15c. Similarly, the second intake passage 14 includes a first intake conduit 14a located downstream of and connected with the compressor 7b, a second intake conduit 14b located downstream of and connected with the compressor 8b, a connecting portion 14c where the first intake conduit 14a and the second intake conduit 14b join each other, and a common intake conduit 14d connecting the connecting portion 14c with the engine air intake. In the common intake pipe 15d, an air cleaner 23 and an air flow meter 24 are installed in that order in the downstream direction. In the common intake conduit 14d, an intercooler 6, a throttle valve 4, and a surge tank 2 are installed, in that order in the downstream direction.

An exhaust line 20, connected to the engine exhaust outlets, includes a first exhaust conduit 20a connected to the first portion of the exhaust manifold 3, a second exhaust conduit 20b connected to the second portion of the exhaust manifold 3, a connecting portion 20c where the first exhaust conduit 20a and the second exhaust conduit 20b join together downstream, and a common exhaust pipe 20d located downstream of and connected to the connecting portion 20c. Turbines 7a and 8a are positioned within the first exhaust conduit 20a and the second exhaust conduit 20b, respectively. In the exhaust pipe 20d, a catalytic converter 21 and an exhaust muffler 22 are installed in that order in the downstream direction. Furthermore an oxygen sensor 19 is installed at or in the vicinity of the connecting portion 20c.

For the purpose of switching between "one-turbocharger-operation," where only the first turbocharger 7 operates at small to medium intake air quantities, and "two-turbocharger-operation," where both the first turbocharger 7 and the second turbocharger 8 operate at large intake air quantities, an exhaust switching valve 17 is installed in the second exhaust conduit 20b downstream of the turbine 8a, and an intake switching valve 18 is installed in the second intake conduit 14b downstream of the compressor 8b. When both the exhaust switching valve 17 and the intake switching valve 18 are closed, the operation of the second turbocharger 8 is stopped and only the first turbocharger 7 is in operation. In contrast, when both the exhaust switching valve 17 and the intake switching valve 18 are opened, both the first turbocharger 7 and the second turbocharger 8 are in operation.

For the purpose of minimizing the shock which typically accompanies the transition from "one-turbocharger-operation" to "two-turbocharger-operation", the second turbocharger 8 should be run-up before it is fully rotated. An exhaust bypass conduit 40 is provided bypassing the exhaust switching valve 17, and the running-up of the second turbocharger 8 is achieved by opening an exhaust bypass valve 41 installed in the exhaust bypass conduit 40. More particularly, when the exhaust bypass valve 41 is opened, a relatively small amount of exhaust gas flows through the exhaust bypass conduit 40 to run-up the second turbocharger 8. When the exhaust switching valve 17 is opened, the rotational speed of the second turbocharger 8 is increased from the run-up rotational speed to a "two-turbocharger-operation" rotational speed. As a result, the reduced increment in the rotational speed effectively attenuates the transition shock.

When the second turbocharger 8 is preliminarily rotated and the intake switching valve 18 is closed, a portion of the pressurized air located in the second intake conduit 14b between the compressor 8b and the intake switching valve 18, will leak upstream through the compressor 8b and flow to a portion of the second intake pipe 15b upstream of the compressor 8b. This leaked air will then again be driven by the compressor 8b and compressed into the portion of the intake conduit downstream of the compressor 8b. This leakage and re-pressurization sequence of the intake air continually repeats and undesirably increases the temperature of the intake air and thus, the temperature of the impeller of the compressor 8b itself. To prevent such temperature increases, an intake bypass conduit 13 is provided to allow the compressed air to bypass the compressor 8b of the second turbocharger 8. More particularly, the intake bypass conduit 13 connects the portion of the second intake conduit 14b positioned between the compressor 8b and the intake switching valve 18 with the first intake passage 15. An intake bypass valve 33 is installed in and is adapted to open and close the intake bypass conduit 13. When the second turbocharger 8 is preliminarily rotated, the intake bypass valve 33 is opened to minimize the intake air temperature increase.

An intake switching valve bypass conduit 34 is provided to connect a portion of the second intake conduit 14b positioned upstream of the intake switching valve 18 with a portion of the intake conduit 14b positioned downstream of the intake switching valve 18 to bypass the intake switching valve 18. A one-way check valve 12 is installed in the intake switching valve bypass conduit 34. The check valve 12 permits the intake air to flow from the portion of the second intake conduit 14b positioned upstream of the intake switching valve 18 toward the portion of the second intake conduit 14b positioned downstream of the intake switching valve 18. As a result, when the intake switching valve 18 is closed and the compressor outlet pressure of the second turbocharger 8 exceeds a compressor outlet pressure of the first turbocharger 7, the check valve 12 opens the intake switching valve bypass conduit 34 and permits the intake air to flow downstream. Furthermore, the turbine 7a is provided with a waste gate valve 31. Additionally, a positive pressure tank 36 is connected with a portion of the common intake conduit 14d upstream of the intercooler 6 and holds a charging pressure therein.

During a rapid deceleration, the throttle valve 4 is rapidly closed. As a result, the intake air pressure upstream of the throttle valve 4 may increase, which then produces a pressure reflection at the throttle valve 4. The pressure reflection causes a surging and a sound at the compressor 7b during "one-turbocharger-operation" and at the compressors 7b and 8b during "two-turbocharger-operation". To prevent such surging, an air bypass conduit 61 is connected at one end to a portion of the second intake passage upstream of the throttle valve 4 and at the other end to a portion of the first intake passage. An air bypass valve 62 is installed in the air bypass conduit 61 and is adapted to open and close the air bypass conduit 61 during a rapid deceleration.

In the first embodiment, the air bypass conduit 61 is connected between the first intake conduit 14a downstream of the first turbocharger compressor 7b and the second intake pipe 15b upstream of the second turbocharger compressor 8b. As a result, the air bypass conduit 61 is physically long compared to an air bypass conduit connected between the first intake conduit 14a downstream of the first turbocharger compressor 7b and the first intake pipe 15a upstream of the first turbocharger compressor 7b. Therefore, when the compressed air circulates through the long air bypass conduit 61, the compressed air can be effectively cooled through the natural heat convection at the surface of the air bypass conduit 61. This prevents the impeller of the first turbocharger compressor 7b from melting even if the temperature of the circulated intake air rises at the compressor 7b.

Figure 6:
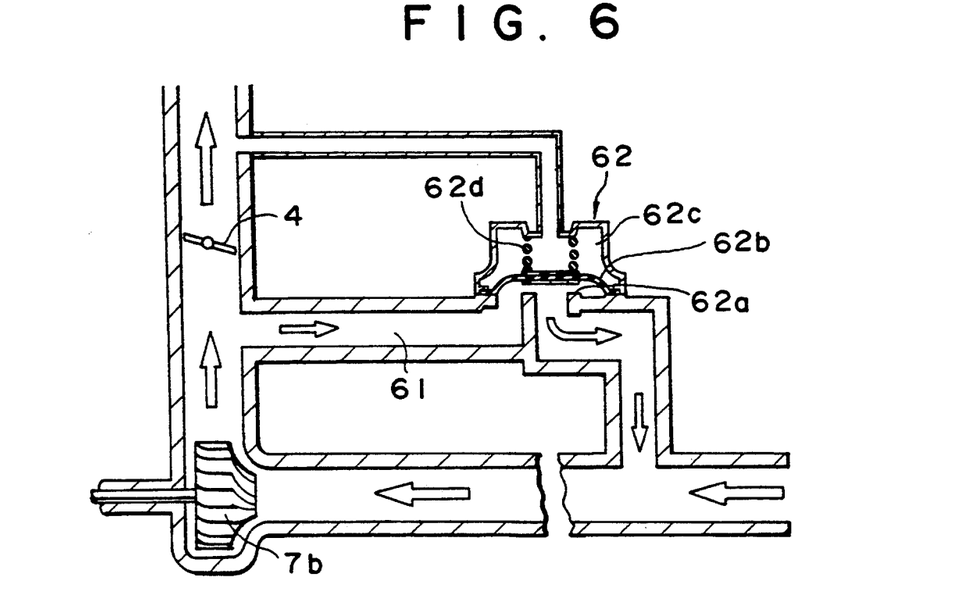
FIG. 6 is an enlarged and isolated schematic view of a portion of the internal combustion engine with the dual turbocharger system of FIG. 1 in the vicinity of an air bypass valve.

As illustrated in FIG. 6, the air bypass valve 62 includes a diaphragm 62b having a first side and an opposite second side. The first side of the diaphragm 62b is connected to an interior of the air bypass conduit 61 so that the charging pressure transmitted through the air bypass conduit 61 directly acts on the diaphragm 62b from the first side of the diaphragm 62b to open the air bypass conduit 61. Since the valve opening force acts directly on the diaphragm 62b, the air bypass valve 62 has a quick response to effectively suppress a surging during a rapid deceleration.

The air bypass valve 62 also includes a diaphragm chamber 62c on the second side of the diaphragm 62b. In the first embodiment, as illustrated in FIG. 6, the diaphragm chamber 62c is connected to a portion of the intake line downstream of the throttle valve 4. The air bypass valve 62 further includes a valve seat 62a, and a spring 62d disposed in the diaphragm chamber 62c to push the diaphragm 62b against the valve seat 62a. The air bypass valve 62 automatically opens and closes without being controlled by a computer.

Various actuators operate the above-described valves except the air bypass valve 62. As shown in FIG. 1, actuator 9 operates the waste gate valve 31, actuator 10 operates the intake bypass valve 33, actuator 11 operates the intake switching valve 18, actuator 16 operates the exhaust switching valve 17, and actuator 42 operates the exhaust bypass valve 41. Each of these actuators is constructed of a diaphragm-type actuator.

Various three-way or two-way solenoid valves 25, 27, 28, 32, and 35 switch on and off the actuators 11, 10, 16, 42, and 9, respectively. The two-way solenoid valve 32 and the solenoid valve 35 are duty-control valves. The opening degree of a duty control valve can be controlled by the duty ratio thereof as is well known. These solenoid valves 25, 27, 28, 32 and 35 operate according to the instructions from an engine control computer 29 (or an electronic control unit).

In this instance, an "ON" setting of the three-way solenoid valve 25 actuates the actuator 11 to open the intake switching valve 18 and an "OFF" setting of the three-way solenoid valve 25 actuates the actuator 11 to close the intake switching valve 18. Similarly, an "ON" setting of the three-way solenoid valve 28 actuates the actuator 16 to open the exhaust switching valve 17 and an "OFF" setting of the three-way solenoid valve 28 actuates the actuator 16 to close the exhaust switching valve 17. An "ON" setting of the three-way solenoid valve 27 actuates the actuator 10 to close the intake bypass valve 33 and an "OFF" setting of the three-way solenoid valve 27 actuates the actuator 10 to open the intake bypass valve 33. An "ON" setting of the two-way solenoid valve 32, which comprises a duty control valve, actuates the actuator 42 to open the exhaust bypass valve 41 and an "OFF" setting of the two-way solenoid valve 32 actuates the actuator 42 to close the exhaust bypass valve 41. Furthermore, the actuator 16 includes a diaphragm chamber 16a, the actuator 10 includes a diaphragm chamber 10a, the actuator 11 includes a diaphragm chamber 11a, the actuator 42 includes a diaphragm chamber 42a, and the actuator 9 includes a diaphragm chamber 9a.

Various sensors for sensing the engine operating conditions are provided and the outputs of the sensors are fed to the engine control computer 29. More particularly, the various sensors include an intake pressure sensor 30, a throttle opening degree detecting sensor 5, an intake air quantity detecting sensor such as an air flow meter 24, the aforementioned oxygen sensor 19, an engine speed or crank angle sensor (not shown), and a vehicle speed sensor (not shown).

Figure 9:
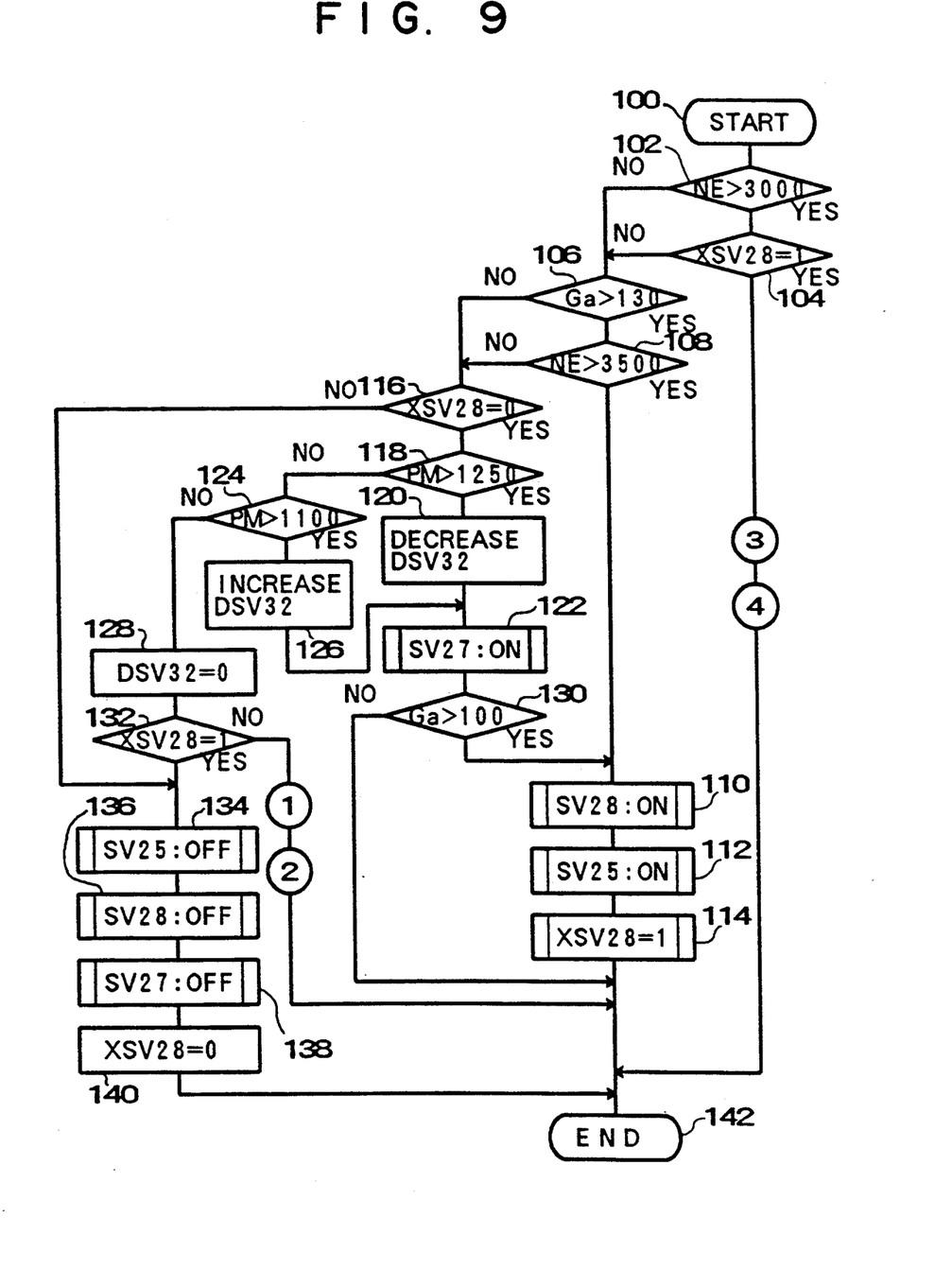
FIG. 9 is a flow chart illustrating a basic operation control of various valves including an intake switching valve of the internal combustion engine of any embodiment of the present invention.

The engine control computer 29 includes a central processor unit (CPU), a read-only memory (ROM), a random access memory (RAM), an input and output interface (I/O interface), and an analog/digital convertor (A/D convertor) like a usual micro computer. The program of FIG. 9 is stored in the ROM and are fed into the CPU where the routine is executed to operate the above-described valves and actuators.

Basic control structures and operation of the turbocharged engine will now be explained with reference to FIG. 9. The routine of FIG. 9 starts at step 100 at predetermined time intervals. At step 102, the routine determines whether the current engine speed NE is larger than a predetermined speed (for example, 3,000 rpm). At step 106, the routine determines whether the current intake air quantity Ga is larger than a predetermined air quantity (for example, 130 g/sec). When the intake air quantity Ga approaches and surpasses 130 g/sec for the first time, the routine proceeds from step 100 to step 106 via step 102. The routine then proceeds to step 110 via step 108, where the solenoid valve 28 is switched to "ON" to open exhaust switching valve 17. Subsequently, the routine proceeds to step 112 where the solenoid valve 25 is switched to "ON" to open the intake switching valve 18 to produce the "two-turbocharger-operation". The routine proceeds to step 114 where an exhaust switching valve opening flag XSV28 is set to "1". The cycle ends at step 142. At the subsequent cycles, if the engine speed NE is greater than 3,000 rpm, the routine proceeds from step 100 to step 104 via step 102. Since flag XSV28 was set to "1" at step 114 in the previous cycle, the routine proceeds from step 104 to step 142 where the cycle ends.

When the current intake air quantity Ga is less than the predetermined intake air quantity (for example, 130 g/sec) or changes from a quantity greater than 130 g/sec to a quantity less than 130 g/sec, the routine proceeds from step 100 to step 106 via step 102 and further to step 116. When the intake air quantity decreases to a quantity less than 130 g/sec, flag XSV28 is "1". Therefore, in the first cycle, the routine proceeds from step 116 to step 134 where the solenoid valve 25 is switched to "OFF" to close the intake switching valve 18. At step 136, the solenoid valve 28 is switched to "OFF" to close the exhaust switching valve 17 producing the "one-turbocharger-operation". At step 138, the solenoid valve 27 is switched to "OFF" to open the intake bypass valve 33. At step 140, flag XSV28 is set to "0" to indicate that the exhaust switching valve 17 is closed. Finally, step 142 ends the cycle.

Since flag XSV28 is set at "0" in the subsequent cycles, the routine proceeds from step 116 to step 118. Since the current intake pressure PM is less than 1,100 mm Hg in absolute pressure at low or intermediate engine loads, the routine proceeds from step 118 to step 128 via step 124, where the duty ratio DSV32 of the two-way solenoid valve 32 is set to 0% to close the exhaust bypass valve 41. Then, the routine proceeds to step 132, and then, since flag XSV28 is set to "0" at the previous cycle, the routine proceeds to step 142 where the cycle ends.

When the current intake air quantity Ga increases and approaches 100 g/sec, the intake pressure PM exceeds 1,100 mm Hg. As a result, the exhaust bypass valve 41 must be open to run-up the second turbocharger 8 to obtain a smooth transition from the "one-turbocharger-operation" to the "two-turbocharger-operation". In such a condition, the routine proceeds from step 116 to step 126 via steps 118 and 124, where the duty ratio of the two-way solenoid valve 32 is increased by a predetermined value (for example, 2%) per cycle so that the exhaust bypass valve 41 opens gradually. The routine then proceeds from step 126 to step 122, where the three-way solenoid valve 27 is switched to "ON" to close the intake bypass valve 33. Then, the routine proceeds to step 130, and if the current intake air quantity Ga exceeds a predetermined value (for example 100 g/sec), the routine proceeds to steps 110 and 112 to produce the "two-turbocharger-operation". However, if the current intake air quantity Ga does not exceed 100 g/sec, the second turbocharger 8 has not yet been run-up sufficiently, and therefore, the routine proceeds from step 130 to step 142 where the cycle ends. If PM is determined to be greater than 1,250 mmHg at step 118, the duty ratio DSV32 of the two-way solenoid valve 32 is decreased or ceases any further increase of the duty ratio DSV32.

Figure 2:
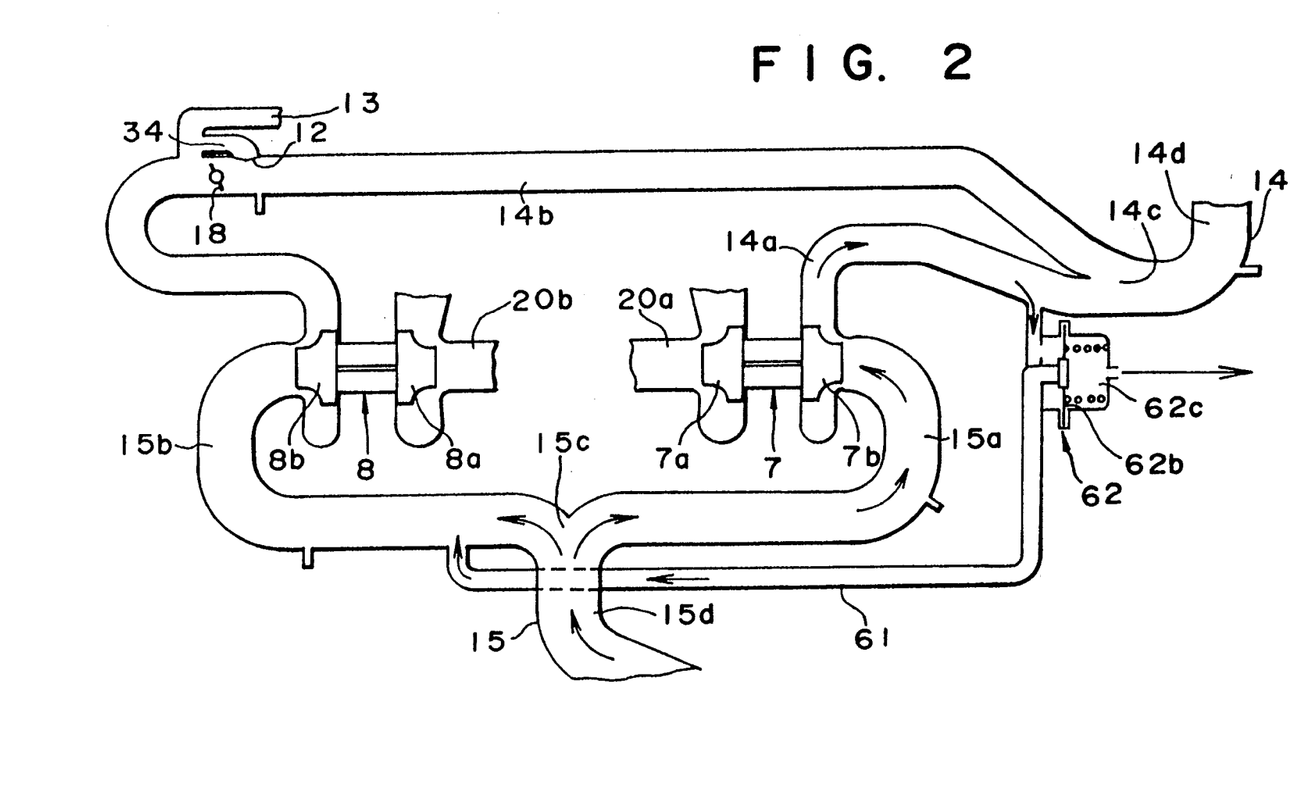
FIG. 2 is an enlarged and isolated schematic view of a portion of the internal combustion engine of FIG. 1 in the vicinity of an air bypass conduit in "one-turbocharger-operation"

As discussed above, the intake switching valve 18 is usually closed in the "one-turbocharger-operation", and usually opened in the "two-turbocharger-operation". In the "one-turbocharger-operation", the throttle valve 4 is rapidly closed such as during a rapid deceleration. This might produce a pressure reflection at the throttle valve 4 and the compressed air might flow upstream toward the first turbocharger compressor 7b if the air bypass conduit 61 were not provided. However, as illustrated in FIG. 2, the first embodiment provides the air bypass conduit 61 and, accordingly, the air bypass valve 62 is automatically opened by the charging pressure. As a result, the compressed air can bypass the first turbocharger compressor 7b and can enter the second intake pipe 15b to effectively suppress any surging at the first turbocharger compressor 7b. Since the diaphragm 62b of the air bypass valve 62 is directly connected to the interior of the air bypass conduit 61, the air bypass valve 62 can open quickly when the charging pressure increases. Furthermore, since the air bypass conduit 61 is connected between the first intake conduit 14a and the second intake pipe 15b, the air bypass conduit 61 is relatively long. As a result, the returned air is sufficiently cooled while it flows through the air bypass conduit 61, thus preventing an excessive temperature rise of the circulated air and melting of the first turbocharger compressor impeller.

Figure 3:
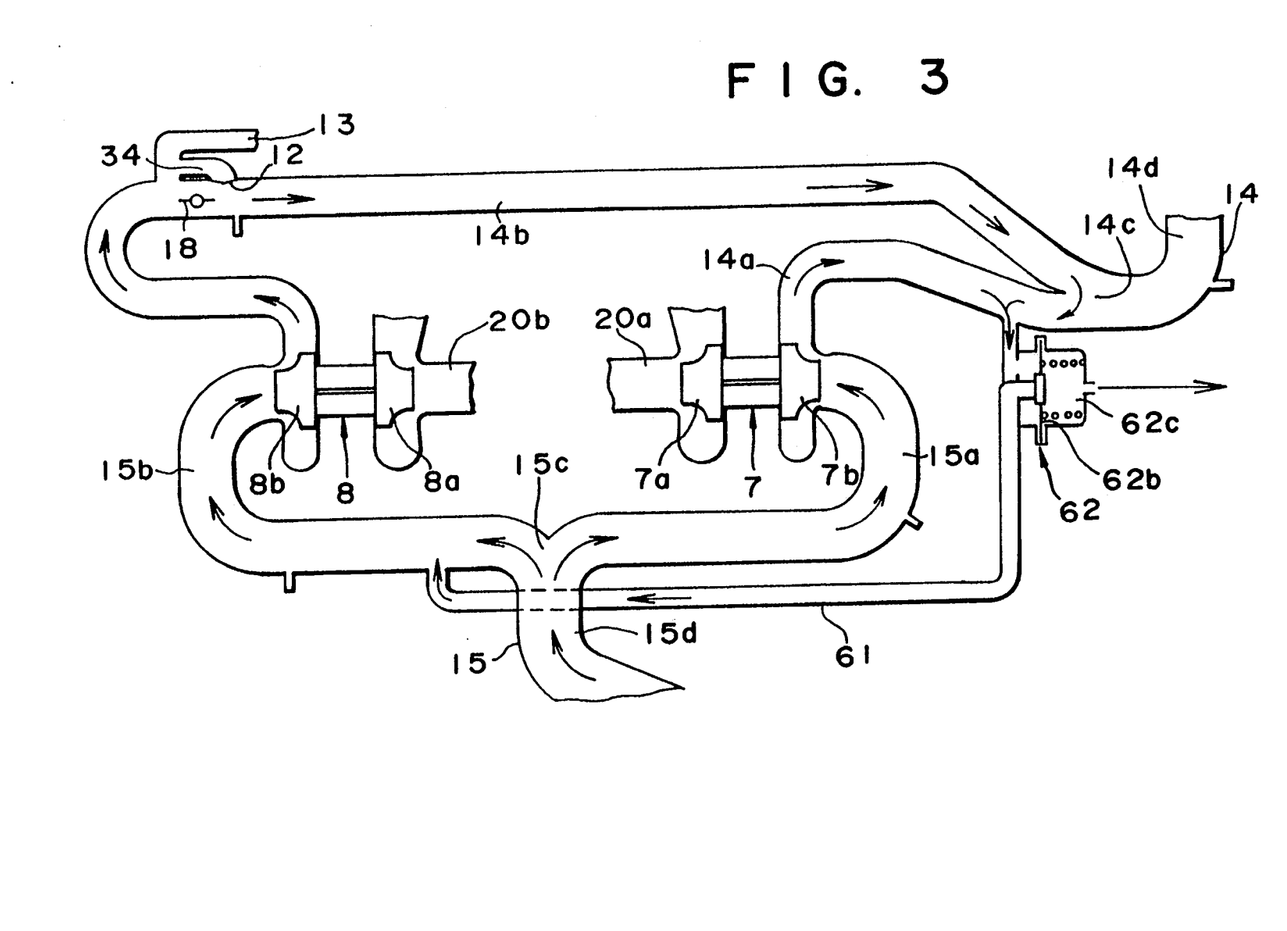
FIG. 3 is an enlarged and isolated schematic view of the portion of the internal combustion engine of FIG. 1 in the vicinity of an air bypass conduit in "two-turbocharger-operation"

In the "two-turbocharger-operation", when the throttle valve 4 is rapidly closed during a rapid deceleration, the compressed air flows from the first intake conduit 14a to the second intake pipe 15b via the air bypass conduit 61, as illustrated in FIG. 3. As in the "one-turbocharger-operation," the "two-turbocharger-operation" utilizes the quick response of the air bypass valve 62 and the natural convection of air bypass conduit 61 to effectively prevent the compressor impeller from melting.

Figure 4:
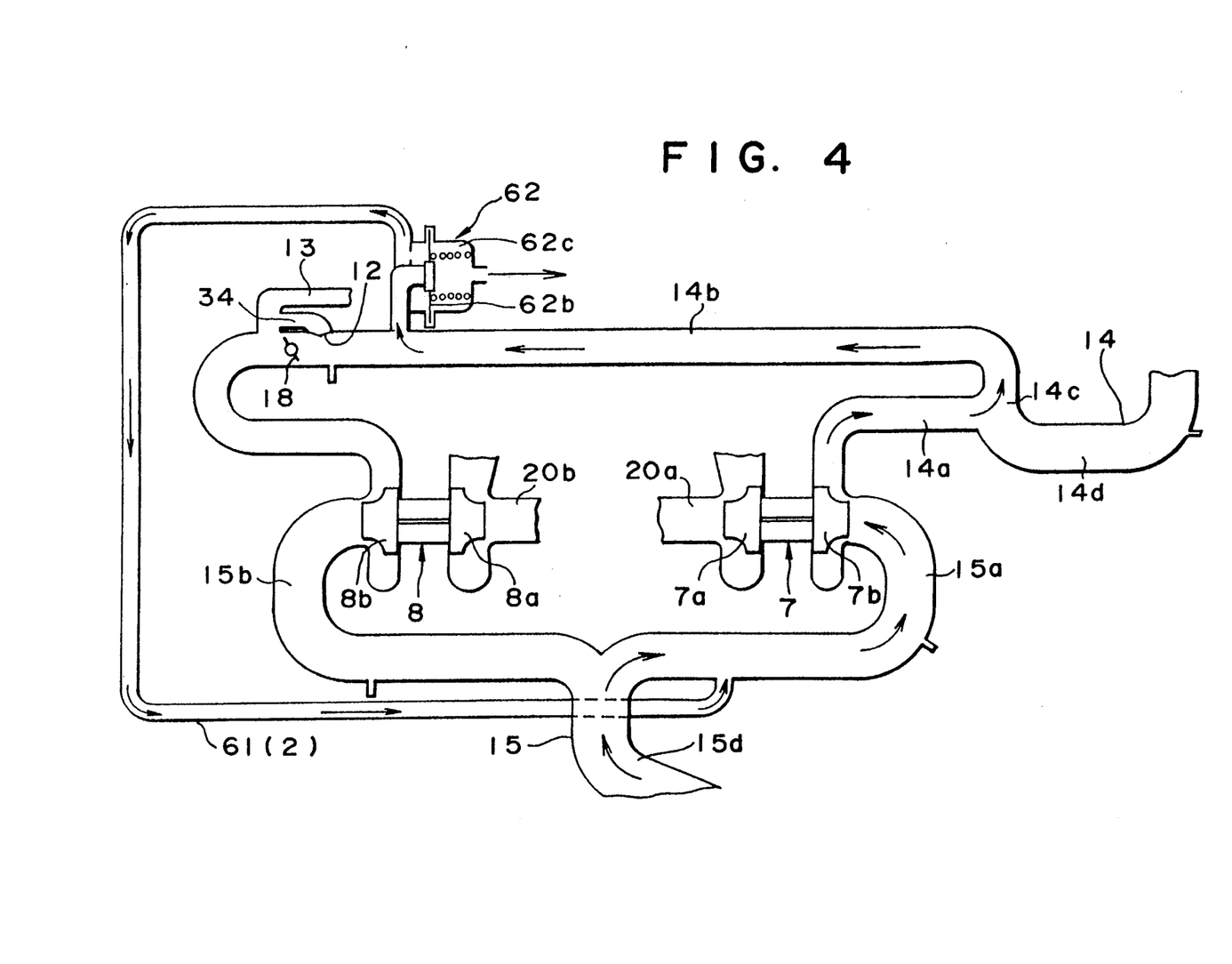
FIG. 4 is an enlarged and isolated schematic view of a portion of the internal combustion engine with a dual turbocharger system in the vicinity of an air bypass conduit in accordance with a second embodiment of the invention in "one-turbocharger-operation"
Figure 5:
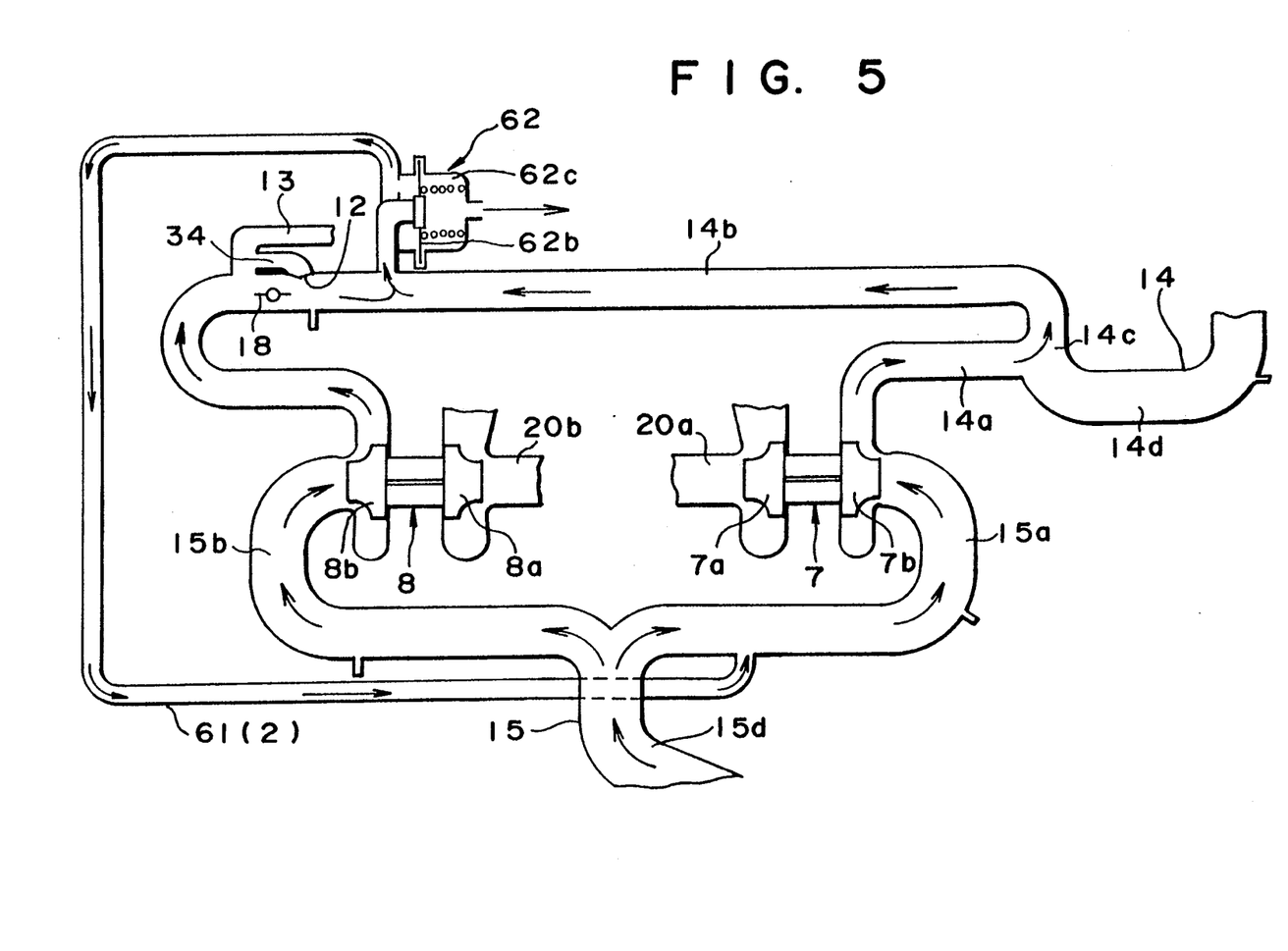
FIG. 5 is an enlarged and isolated schematic view of a portion of the internal combustion engine of FIG. 4 in "two-turbocharger-operation"

FIGS. 4 and 5 illustrate a second embodiment of the invention which differs from the first embodiment only in that an air bypass conduit 61(2), which corresponds to the air bypass conduit 61 of the first embodiment, is connected between a portion of the second intake conduit 14b downstream of the intake switching valve 18 and the first intake pipe 15a. FIG. 4 illustrates an air flow when the throttle valve 4 is rapidly closed in the "one-turbocharger-operation". FIG. 5 illustrates an air flow when the throttle valve 4 is rapidly closed in the "two-turbocharger-operation". Since other structures, operation, and advantages of the second embodiment are similar to those of the first embodiment, explanation about the same structures, operation, and advantages will be omitted.

Figure 7:
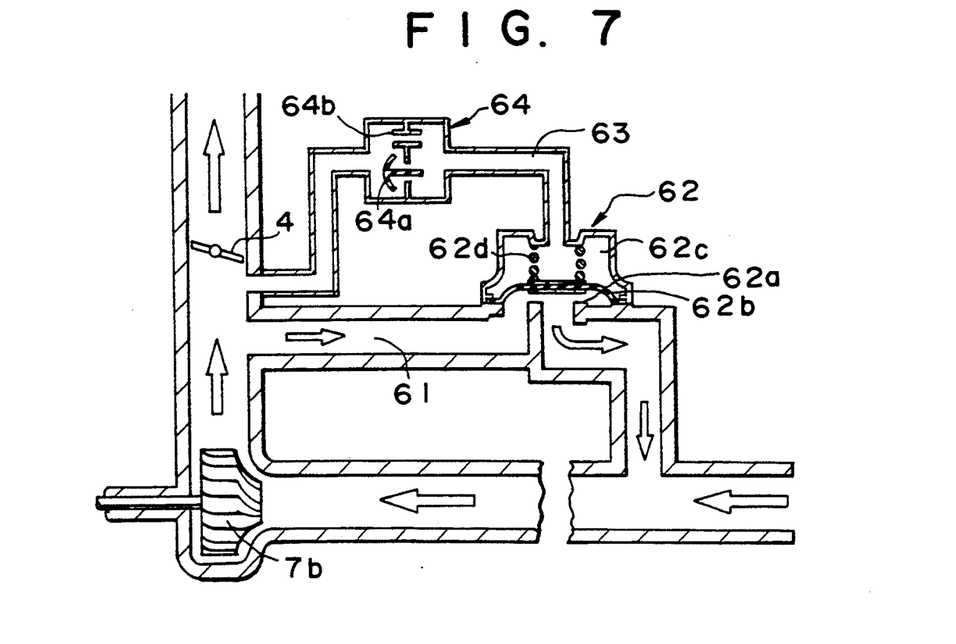
FIG. 7 is an enlarged and isolated schematic view of a portion of an internal combustion engine with a dual turbocharger system in the vicinity of an air bypass valve in accordance with a third embodiment of the invention.

FIG. 7 illustrates a third embodiment of the invention which differs from the first embodiment in that the diaphragm chamber 62c is connected to a portion of the intake line upstream of the throttle valve 4 and downstream of the first turbocharger compressor 7b and the second turbocharger compressor 8b via a pressure transmittance passage 63 and in that a pressure transmittance delay valve 64 is also installed in the pressure transmittance passage 63. The pressure transmittance delay valve 64 has an aperture 64b formed in a partition of the valve and a one-way valve body 64a which permits air flow only in the direction from air bypass valve 62 to the intake line or the pressure tank.

When the throttle valve 4 is rapidly closed and the charging pressure grows, the charging pressure is transmitted to one side of the diaphragm 62b. The transmittance delay passage 64 provides some delay in the growing charging pressure from reaching the diaphragm chamber 62c. As a result, the diaphragm 62b moves away from the valve seat 62a to momentarily open the air bypass conduit 61 until the pressure of the diaphragm chamber 62c finally reaches the charging pressure.

In the third embodiment, the diaphragm 62b of the air bypass valve 62 is directly connected to the air bypass conduit 61 so that the air bypass valve 62 can quickly respond to the increase in the charging pressure. One end of the air bypass conduit 61 is connected to one of the first and second intake conduits 14a and 14b and the other end may be connected to any of the first and second intake pipes 15a and 15b. Since other structures, operation and advantages of the third embodiment are the same as those of the first embodiment, explanation about the same structures, operation and advantages will be omitted.

Figure 8:
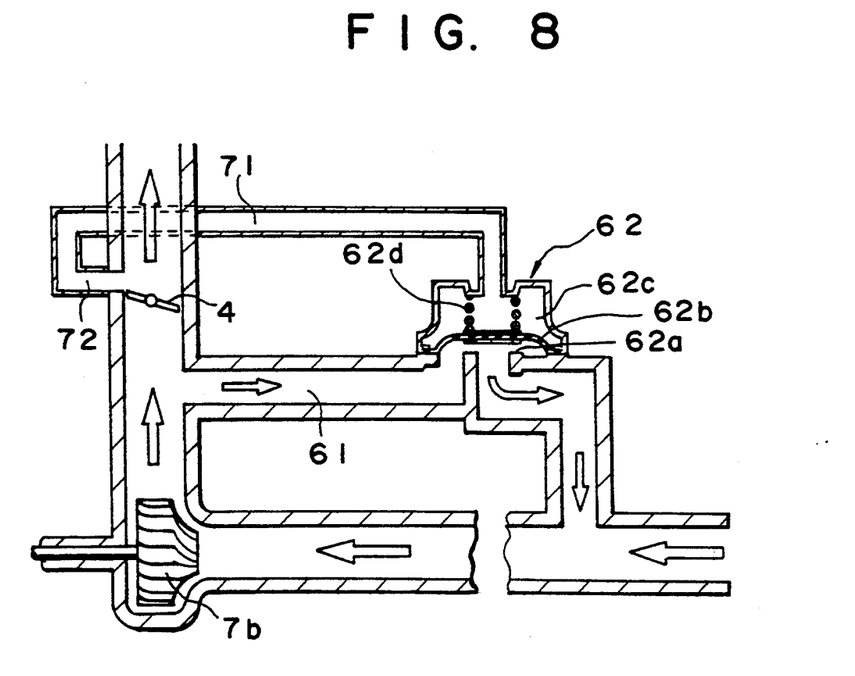
FIG. 8 is an enlarged and isolated schematic view of a portion of an internal combustion engine with a dual turbocharger system in the vicinity of an air bypass valve in accordance with a fourth embodiment of the invention.

FIG. 8 illustrates a fourth embodiment of the invention which differs from the first embodiment in that the diaphragm chamber 62c is connected to an air port 72 via a pressure transmittance passage 71 for the throttle valve 4. The air port 72 is at a negative pressure when the throttle valve 4 is fully closed. When the throttle valve 4 is rapidly closed during a rapid deceleration, the charging pressure is transmitted to one side of the diaphragm 62b via air bypass conduit 61 and a negative pressure from the air port 72 pulls the diaphragm chamber 62c via the pressure transmittance passage 71 so that the diaphragm 62b moves away from the valve seat to open the air bypass valve 61.

In the fourth embodiment, the diaphragm 62b of the air bypass valve 62 is directly connected to the air bypass conduit 61 so that the air bypass valve 62 can quickly respond to the increase in the charging pressure. One end of the air bypass conduit 61 is connected to one of the first and second intake conduits 14a and 14b and the other end may be connected to any of the first and second intake pipes 15a and 15b. Since other structures, operation and advantages of the fourth embodiment are the same as those of the first embodiment, explanation about the same structures, operation and advantages will be omitted.

Figure 10:
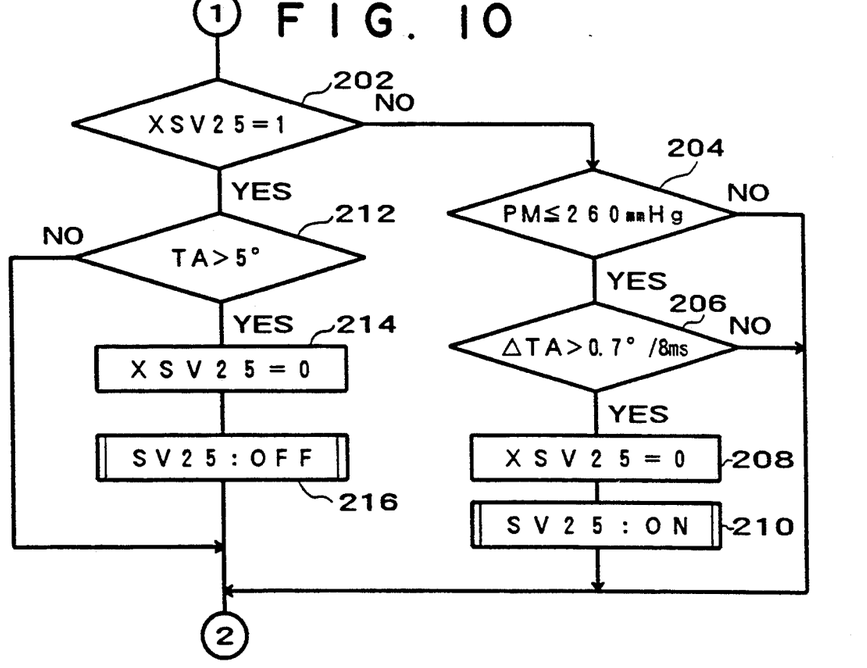
FIG. 10 is a partial flow chart illustrating an additional operation control of an intake switching valve during a rapid deceleration, specific to a fifth embodiment of the invention.

FIG. 10 illustrates a routine specific to a fifth embodiment of the present invention. The routine should be inserted into the portion denoted with connectors (1)-(2) of the routine of FIG. 9. In the fifth embodiment, only when the intake pressure PM is less than or equal to a predetermined pressure (for example, 260 mm Hg in absolute pressure), the three-way solenoid valve 25 is switched to "ON" to open the intake switching valve 18. During a rapid deceleration in the "one-turbocharger-operation", the capacity of the air bypass valve 62 may be insufficient to suppress an excessive increase in the charging pressure and thus, a relatively large surging may occur. To prevent such surging, the air bypass valve 62 and the intake switching valve 18 are opened to suppress an increase in the charging pressure.

In FIG. 10, step 202 of the routine determines whether the intake switching valve opening flag XSV25 is set to "1". If flag XSV25 is not "1" at step 202, which is an indication that the intake switching valve 18 is in a close condition, the routine proceeds to steps 204 and 206. If the current intake pressure PM is less than or equal to 260 mm Hg and the closing speed of the throttle valve 4 (delta TA) is higher than 0.7°/8 msec, the condition is deemed to be in a rapid deceleration and the routine proceeds to steps 208 and 210. Flag XSV25 is set to "1" at step 208 and the three-way solenoid valve 25 is switched to "ON" at step 210 to open the intake switching valve 18.

If flag XSV25 is "1" at step 202, the routine proceeds to step 212 to determine whether the throttle opening angle TA is larger than 5°. If TA is less than 5° at step 212, the charging pressure may increase excessively, and therefore, the routine skips the steps 214 and 216 to maintain the opening of the intake switching valve 18. If TA is greater than 5° at step 212, the charging pressure will not increase excessively, and therefore the routine proceeds to step 214, where flag XSV25 is reset to "0," and step 216, where the three-way solenoid valve 25 is switched to "OFF" to close the intake switching valve 18. This suppresses any further pressure decrease of the pressure tank 36. A pressure decrease of the pressure tank 36 would create problems for the actuators controlled by the charging pressure held in the pressure tank 36.

Figure 11:
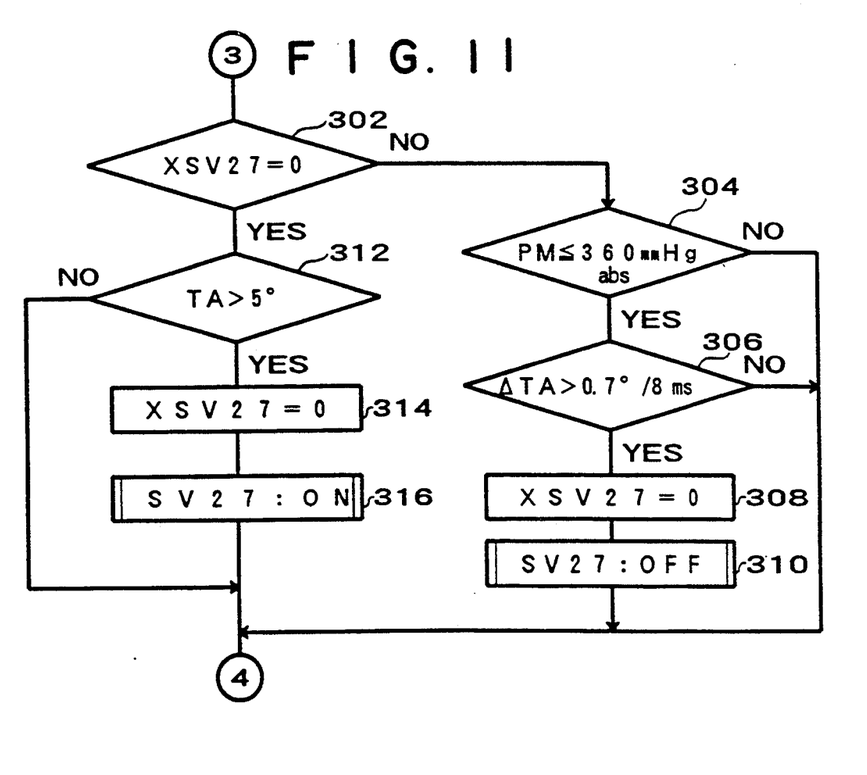
FIG. 11 is a partial flow chart illustrating an additional operation control of an intake bypass valve during a rapid deceleration, specific to a sixth embodiment of the invention.

FIG. 11 illustrates a routine specific to a sixth embodiment of the present invention. This routine should be inserted into the portion denoted with connectors (3)-(4) of the routine of FIG. 9. In the sixth embodiment, only when the intake pressure PM is less than or equal to a predetermined pressure (for example, 360 mm Hg in absolute pressure) in the "two-turbocharger-operation", the three-way solenoid valve 27 is switched to "OFF" to open the intake bypass valve 33. During a rapid deceleration in the "two-turbocharger-operation", the capacity of the air bypass valve 62 may be insufficient to suppress an excessive increase in the charging pressure and thus, a relatively large surging may occur. To prevent such surging, the air bypass valve 62 and the intake bypass valve 33 are opened to suppress an increase in the charging pressure.

In FIG. 11, step 302 determines whether the intake bypass valve opening flag XSV27 is set to be "0". If flag XSV27 is not "0" at step 302, which is an indication that the intake bypass valve 33 is in a close condition, the routine proceeds to steps 304 and 306. If the current intake pressure PM is less than or equal to 360 mm Hg and the closing speed of the throttle valve 4 (delta TA) is greater than 0.7°/8 msec, the condition is deemed to be in a rapid deceleration, and the routine proceeds to steps 308 and 310. At step 308, the flag XSV27 is reset to "0." At step 310, the three-way solenoid valve 27 is switched to "OFF" to open the intake bypass valve 33. If flag XSV27 is "0" at step 302, the routine proceeds to step 312 to determine whether the throttle opening angle TA is larger than 5°. If TA is less than or equal to 5° at step 312, the charging pressure may increase excessively, and therefore, the routine skips steps 314 and 316 to maintain the opening of the intake bypass valve 33. If TA is greater than 5° at step 312, the charging pressure will not increase excessively, and therefore the routine proceeds to step 314, where flag XSV27 is set to "0", and step 316, where the solenoid valve 27 is switched to "ON" to close the intake bypass valve 33. This suppresses any further pressure decrease of the pressure tank 36 is suppressed.

Figure 12:
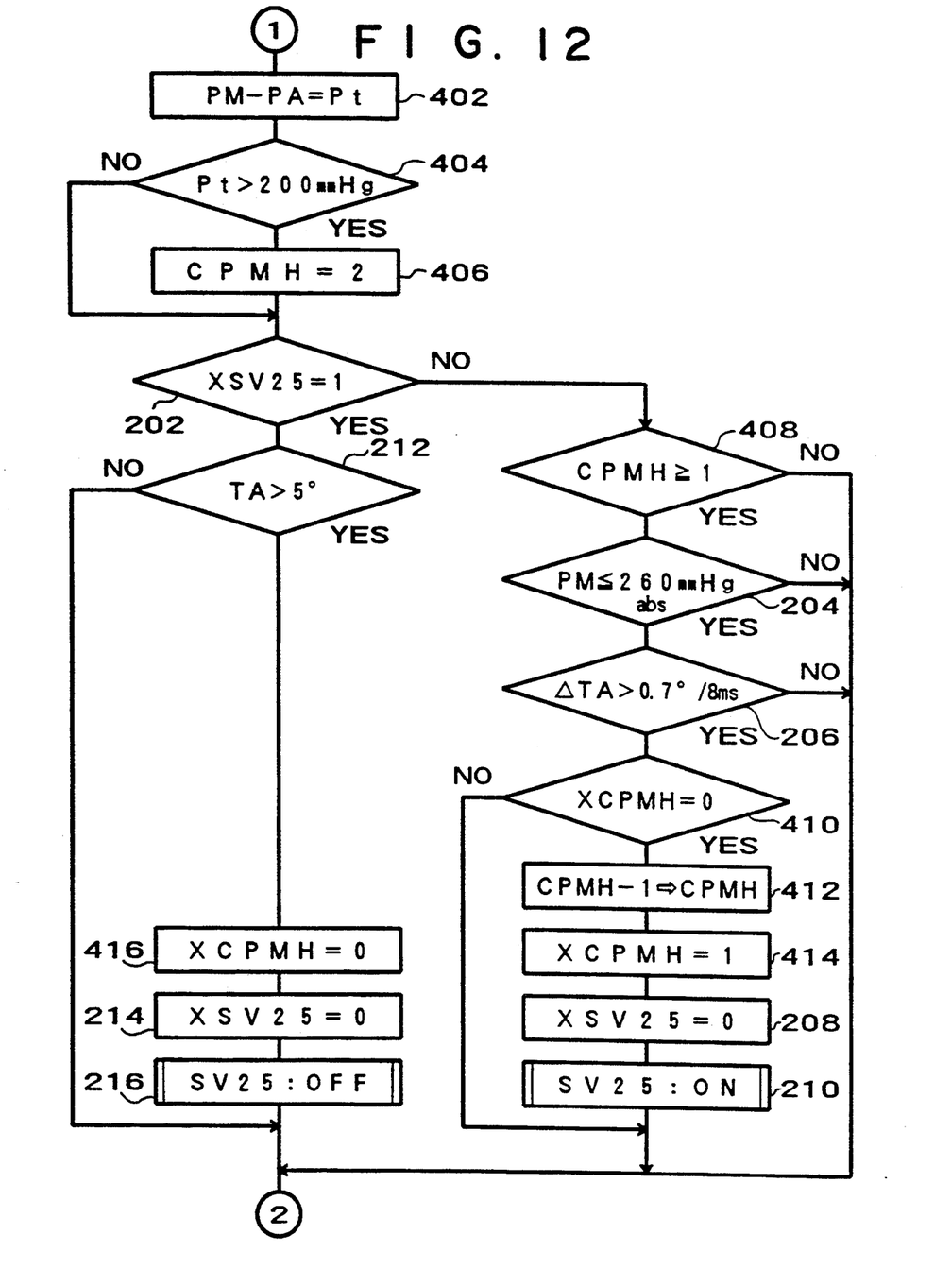
FIG. 12 is a partial flow chart illustrating an additional operation control of an intake switching valve during a rapid deceleration, specific to a seventh embodiment of the invention.

FIG. 12 illustrates a routine specific to a seventh embodiment of the present invention. This routine should be inserted into the portion denoted with connectors (1)-(2) of the routine of FIG. 9. In the seventh embodiment, opening of the intake switching valve 18 to suppress a surging like the fifth embodiment is performed only once after a sufficiently large positive pressure has been held within the pressure tank 36. As a result, any pressure decrease of the pressure tank 36 is more surely prevented than in the fifth embodiment.

More particularly, the routine of FIG. 12 includes the same steps 202-216 as those of the fifth embodiment and additional steps 402-416 for opening the intake switching valve 18 only once after the positive pressure held within the pressure tank 36 has been sufficiently large. At steps 402 and 404, if the pressure difference Pt between the intake pressure PM and a predetermined pressure PA is larger than 200 mm Hg, the routine considers that a sufficiently large positive pressure has been held within the pressure tank 36. Accordingly, the pressure counter CPMH is set to "2" at step 406. Then, during a rapid deceleration, the routine proceeds from step 406 to step 408 via step 202. If a sufficiently large positive pressure is held within the pressure tank 36, CPMH is equal to or larger than "1" at step 408 and the routine proceeds to step 410 via steps 204 and 206. If the cycle is a first cycle, flag XCPMH is "0" and the routine proceeds to step 412, where counter CPMH is reduced by one, and to step 414 where flag XCPMH is set to "1". At this point, the intake switching valve 18 has been opened once. The routine then proceeds to steps 208 and 210 where the intake switching valve 18 is opened.

At step 410 in a subsequent cycle, the routine determines that flag XCPMH is not equal to "0" and the routine skips steps 412, 414, 208, and 210, so that the intake switching valve 18 is opened only once. If the positive pressure within the pressure tank 36 has not been sufficiently large, the routine returns from step 408 skipping steps 204, 206, 410, 412, 414, 208, and 210, so that the intake switching valve 18 is not opened more than once after the pressure within the pressure tank 36 has been sufficiently large. When the routine proceeds from step 202 via step 212, flag XCPMH is cleared to "0" at step 416.

Figure 13:
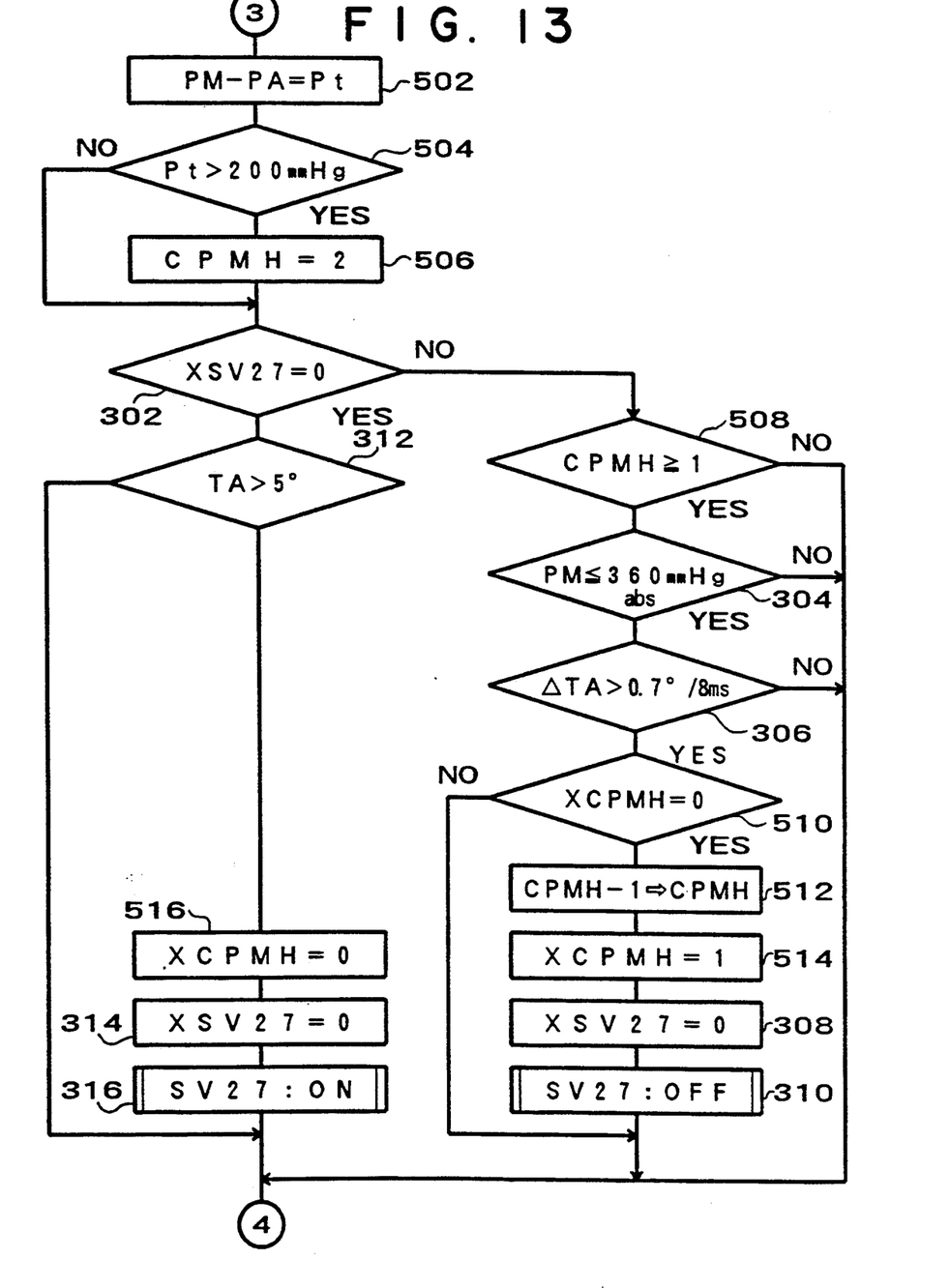
FIG. 13 is a partial flow chart illustrating an additional operation control of an intake switching valve during a rapid deceleration, specific to an eighth embodiment of the invention.

FIG. 13 illustrates a routine specific to an eighth embodiment of the present invention. This routine should be inserted into the portion denoted with connectors (3)-(4) of the routine of FIG. 9. In the eighth embodiment, opening of the intake bypass valve 33 to suppress a surging like the sixth embodiment is performed only once after a sufficiently large positive pressure has been held within the pressure tank 36. As a result, any pressure decrease of the pressure tank 36 is more surely prevented than in the sixth embodiment.

More particularly, the routine of FIG. 13 includes the same steps 302-316 as those of the sixth embodiment and additional steps 502-516 for opening the intake bypass valve 33 only once after the positive pressure held within the pressure tank 36 has been sufficiently large. At steps 502 and 504, if the pressure difference Pt between the intake pressure PM and a predetermined pressure PA is larger than 200 mm Hg, the routine considers that a sufficiently large positive pressure has been held within the pressure tank 36. Accordingly, the pressure counter CPMH is set to "2" at step 506. Then, during a rapid deceleration, the routine proceeds to step 508 via step 302. If a sufficiently large positive pressure is held within the pressure tank 36, CPMH is equal to or larger than 1 at step 508 and the routine proceeds to step 510 via steps 304 and 306. If the cycle is a first cycle, flag XCPMH is "0" and the routine proceeds to step 512, where counter CPMH is reduced by one, and to step 514, where flag XCPMH is set to "1" At this point, the intake bypass valve 33 has been opened once. The routine then proceeds to steps 308 and 310 where the intake bypass valve 33 is opened.

At step 510 in a subsequent cycle, the flag XCPMH is not equal to "0" and the routine skips steps 512, 514, 308, and 310, so that the intake bypass valve 33 is opened only once. If the positive pressure within the pressure tank 36 has not been sufficiently large, the routine returns from step 508 skipping steps 304, 306, 510, 512, 514, 308, and 310, so that the intake bypass valve 33 is not opened more than once after the pressure within the pressure tank 36 has been sufficiently large. When the routine proceeds from step 302 via step 312, flag XCPMH is cleared to "0" at step 516.

In accordance with any embodiments of the present invention, a surging during a rapid deceleration is effectively prevented without causing melting of the compressor impeller.

Although several embodiments of the invention have been described in detail above, those skilled in the art will appreciate that various modifications and alterations can be made to the particular embodiments shown without materially departing from the novel teachings and advantages of the invention. Accordingly, all such modifications and alterations are included within the spirit and scope of the present invention as defined by the following claims.

What is claimed is:

1. An internal combustion engine with a dual turbocharger system comprising:

a multi-cylinder internal combustion engine with at least one air intake and at least one exhaust outlet, wherein the engine includes a first and a second group of cylinders;

an exhaust manifold connected with the engine exhaust outlet, the exhaust manifold including a first portion connected to the first group of the cylinders and a second portion connected to the second group of the cylinders, the first portion and the second portion of the exhaust manifold joined to each other by a connecting conduit;

a first turbocharger and a second turbocharger arranged in parallel with each other, each including a turbine and a turbine driven compressor, the turbines being connected with the engine exhaust outlet by the exhaust manifold and the compressors being connected with the air intake of the engine;

an intake line including a first intake passage connected to intakes of said first and second turbocharger compressors, and a second intake passage connected to outlets of said compressors, said first intake passage including a first intake pipe connected to the first turbocharger compressor, a second intake pipe connected tot he second turbocharger compressor, a pipe connecting portion joining the first intake pipe and the second intake pipe, and a common intake pipe located upstream and connected to the pipe connecting portion, said second intake passage including, a first intake conduit connected with the first turbocharger compressor, a second intake conduit connected with the second turbocharger compressor, an intake connecting portion joining the first intake conduit and the second intake conduit, and an intake common conduit connecting the intake connecting portion to the air intake of the engine;

an exhaust line including a first exhaust conduit connected with the first portion of the exhaust manifold, in which the first turbocharger turbine is installed, a second exhaust conduit connected with the second portion of the exhaust manifold, in which the second turbocharger turbine is installed;

a throttle valve installed in the intake common conduit;

an intake switching valve installed downstream of the second turbocharger compressor in the second intake conduit and adapted to open and close the second intake conduit;

an exhaust switching valve installed in the second exhaust conduit and adapted to open and close the second exhaust conduit;

an air bypass conduit connecting the first intake conduit and the second intake pipe; and an air bypass valve installed in the air bypass conduit and adapted to open and close the air bypass conduit during a rapid deceleration, the air bypass valve including a diaphragm having a first side and an opposite second side, the first side of the diaphragm being connected to an interior of the air bypass conduit so that a charging pressure transmitted through the air bypass conduit acts directly on the diaphragm from the first side of the diaphragm.

2. An internal combustion engine according to claim 1, and further comprising:

an exhaust bypass conduit connecting a portion of the second exhaust conduit upstream of the exhaust switching valve with one of a portion of the first exhaust conduit downstream of the first turbocharger turbine and a portion of the second exhaust conduit downstream of the exhaust switching valve; and an exhaust bypass valve installed in the exhaust bypass conduit and adapted to open and close the exhaust bypass conduit.

3. An internal combustion engine according to claim 1, and further comprising:

an intake bypass conduit connecting a portion of the second intake conduit downstream of the second turbocharger compressor and upstream of the intake switching valve with a portion of the first intake passage; and an intake bypass valve installed in the intake bypass conduit and adapted to open and close the intake bypass conduit.

4. An internal combustion engine according to claim 1, and further comprising:

an intake switching valve bypass conduit bypassing the intake switching valve; and a one-way valve installed in the intake switching valve bypass conduit and adapted to permit air to flow only from an upstream portion of the intake air switching valve to a downstream portion of the intake air switching valve.

5. An internal combustion engine according to claim 1, wherein the air bypass valve includes a diaphragm chamber on the second side of the diaphragm, the diaphragm chamber being connected to a portion of the intake line downstream of the throttle valve.

6. An internal combustion engine according to claim 1, wherein the air bypass valve includes a diaphragm chamber on the second side of the diaphragm, the diaphragm chamber being connected to a portion of the second intake passage upstream of the throttle valve via a pressure transmittance delay valve.

7. An internal combustion engine according to claim 1, wherein the air bypass valve includes a diaphragm chamber on the second side of the diaphragm, the diaphragm chamber being connected to an air port for the throttle valve which is at a negative pressure when the throttle valve is fully closed.

8. An internal combustion engine according to claim 1, wherein the air bypass valve includes:

a valve seat positioned on the first side of the diaphragm;

a diaphragm chamber provided on the second side of the diaphragm; and a spring positioned in the diaphragm chamber to push the diaphragm against the valve seat.

9. An internal combustion engine according to claim 1, and further comprising:

a pressure tank connected to a portion of the second intake passage upstream of the throttle valve and holding a positive charging pressure therein;

a diaphragm-type actuator operatively coupled to the intake switching valve and having a diaphragm chamber which is connected with the pressure tank via a pressure transmittance line; and a solenoid valve installed in the pressure transmittance line and adapted to conduct the pressure held in the pressure tank to the diaphragm chamber of the actuator to open the intake switching valve when the throttle valve is rapidly closed during one-turbocharger-operation.

10. An internal combustion engine according to claim 3, and further comprising:

a pressure tank connected to a portion of the second intake passage upstream of the throttle valve and holding a positive charging pressure therein;

a diaphragm-type actuator operatively coupled to the intake bypass valve and having a diaphragm chamber which is connected with the pressure tank via a pressure transmittance line; and a solenoid valve installed in the pressure transmittance line and adapted to conduct the pressure held in the pressure tank to the diaphragm chamber of the actuator to open the intake bypass valve when the throttle valve is rapidly closed during two-turbocharger-operation.

11. An internal combustion engine according to claim 1, and further comprising:

a pressure tank connected to a portion of the second intake passage upstream of the throttle valve and holding a positive charging pressure therein;

a diaphragm-type actuator operatively coupled to the intake switching valve and having a diaphragm chamber which is connected with the pressure tank via a pressure transmittance line; and a solenoid valve installed in the pressure transmittance line and adapted to conduct the pressure held in the pressure tank to the diaphragm chamber of the actuator to open the intake switching valve when the throttle valve is rapidly closed during one-turbocharger-operation and the intake switching valve is opened only once after the pressure held in the pressure tank has exceeded a predetermined positive pressure.

12. An internal combustion engine according to claim 3, and further comprising:

a pressure tank connected to a portion of the second intake passage upstream of the throttle valve and holding a positive charging pressure therein;

a diaphragm-type actuator operatively coupled to the intake bypass valve and having a diaphragm chamber which is connected with the pressure tank via a pressure transmittance line; and a solenoid valve installed in the pressure transmittance line and adapted to conduct the pressure held in the pressure tank to the diaphragm chamber of the actuator to open the intake bypass valve when the throttle valve is rapidly closed during two-turbocharger-operation and the intake bypass valve is opened only once after the pressure held in the pressure tank has exceeded a predetermined positive pressure.

* * * * *